US012597065B2

(12) United States Patent
Chattopadhyay Debnath et al.

(10) Patent No.: US 12,597,065 B2
(45) Date of Patent: Apr. 7, 2026

(54) PROBABILISTIC ACCOUNT LINKING

(71) Applicant: eBay Inc., San Jose, CA (US)

(72) Inventors: Sahana Chattopadhyay Debnath, San Jose, CA (US); Thomas Schweiger, Seattle, WA (US)

(73) Assignee: eBay Inc., San Jose, CA (US)

( * ) Notice: Subject to any disclaimer, the term of this patent is extended or adjusted under 35 U.S.C. 154(b) by 119 days.

(21) Appl. No.: 18/609,576

(22) Filed: Mar. 19, 2024

(65) Prior Publication Data

US 2025/0299194 A1 Sep. 25, 2025

(51) Int. Cl.
*G06Q 40/02* (2023.01)
*G06Q 20/40* (2012.01)

(52) U.S. Cl.
CPC ....... *G06Q 40/024* (2025.08); *G06Q 20/4016* (2013.01)

(58) Field of Classification Search
CPC .. G06Q 20/4016; G06Q 40/024; G06Q 20/12; G06Q 20/405; G06Q 30/0601; G06Q 30/0609; G06Q 30/0185; G06F 18/23
See application file for complete search history.

(56) References Cited

U.S. PATENT DOCUMENTS

| | | | |
|---|---|---|---|
| 8,606,631 B2 | 12/2013 | Blagg | |
| 9,691,058 B2 | 6/2017 | Epler et al. | |
| 10,621,492 B2 | 4/2020 | Oberhofer et al. | |

| | | | |
|---|---|---|---|
| 2014/0330845 A1* | 11/2014 | Feldschuh | G06F 16/215 |
| | | | 707/749 |
| 2017/0286539 A1 | 10/2017 | Smith et al. | |
| 2018/0113928 A1* | 4/2018 | Oberhofer | G06N 20/00 |
| 2019/0295089 A1* | 9/2019 | Jia | G06N 20/00 |
| 2022/0253406 A1 | 8/2022 | Abu-Abed et al. | |

FOREIGN PATENT DOCUMENTS

| | | |
|---|---|---|
| CN | 109150974 B | 6/2020 |

OTHER PUBLICATIONS

Ahmad et al., "Missing Link Prediction using Common Neighbor and Centrality based Parameterized Algorithm", Scientific Reports—Natureresearch, vol. 10, No. 364, 2020, 9 pages.

(Continued)

*Primary Examiner* — Lindsay M Maguire
(74) *Attorney, Agent, or Firm* — Shook Hardy & Bacon L.L.P.

(57) ABSTRACT

Some aspects relate to technologies for probabilistic account linking, for instance, to perform fraud detection on online transaction platforms. In accordance with some configurations, linking strategies are defined for linking accounts based on account attributes. An average linking probability is generated for each linking strategy using account data for accounts on an online transaction platform, and the average linking probabilities are stored. To determine whether to link two accounts, linking strategies shared by the two accounts are identified, an account linking probability for the two accounts is generated using the average linking probabilities for the linking strategies shared by the two accounts, and the account linking probability is compared against a threshold. If the account linking probability satisfies the threshold, the accounts are linked and an action is taken based on the account linking.

20 Claims, 9 Drawing Sheets

(56) References Cited

OTHER PUBLICATIONS

Brown et al., "Estimating parameters for probabilistic linkage of privacy-preserved datasets", BMC Medical Research Methodology, vol. 17, No. 95, Jul. 2017, 11 pages.

Dasylva et al., "Revisiting the probabilistic method of record linkage", Available at : <arXiv:1911.01874v1 [stat.ME] Nov. 5, 2019>, Nov. 5, 2019, 96 pages.

Farley et al., "A Bayesian Approach to Linking Data Without Unique Identifiers", Journal of Statistical Software, vol. 10, No. 2, Available at : <https://arxiv.org/pdf/2012.00601.pdf>, Sep. 27, 2021, pp. 1-26.

Goga, O., "Matching user accounts across online social networks :methods and applications", HAL Open Science, Jun. 18, 2015. 151 pages.

Sayers et al., "Probabilistic record linkage", International Journal of Epidemiology, vol. 45, No. 3, 2016, pp. 954-964.

Seidl et al., "CC-MR-Finding Connected Components in Huge Graphs with MapReduce", Data Management and Data Exploration Group, pp. 1-16.

Talburt, J., "Entity Resolution and Information Quality", Google Books—Elsevier, 2011, 1 page.

Veigh et al., "Scaling Bayesian Probabilistic Record Linkage with Post-Hoc Blocking: An Application to the California Great Registers",Available at : <arXiv:1905.05337v2 [stat.ME] Jan. 7, 2020>, Jan. 8, 2020. 69 pages.

Yang et al., "A user identity matching method based on integrating account attributes", Journal of Physics: Conference Series, 2018, 8 pages.

Chang et al., "AI-URG: Account Identity-Based Uncertain Graph Framework for Fraud Detection", IEEE Transactions on Computational Social Systems, vol. 11, No. 3, Nov. 2, 2023, pp. 3706-3728.

Extended European Search Report received for European Patent Application No. 25164022.3, mailed on Jul. 30, 2025, 9 pages.

* cited by examiner

| ACCOUNT ID | CLUSTER ID |
|------------|------------|
| A | C1 |
| B | C1 |
| C | C1 |
| D | C2 |
| E | C2 |
| F | C3 |

| ACCOUNTS _302_ | AVERAGE LINKING PROBABILITY _304_ | LINKING STRATEGY _306_ |
|---|---|---|
| A-B | 0.97 | EMAIL-ADDRESS |
| A-B | 0.1 | EMAIL |
| A-B | 0.02 | IP ADDRESS |
| A-B | 0.4 | ADDRESS-CREDIT CARD |
| A-B | 0.3 | ADDRESS-IP ADDRESS |
| A-B | 0.5 | PHONE |
| A-B | 0.02 | MACHINE ID |
| A-B | 0.33 | BANK ACCOUNT |

*FIG. 3*

ACCESS ACCOUNT DATA — 402

GENERATE AVERAGE LINKING PROBABILITIES FOR LINKING STRATEGIES BASED ON ACCOUNT DATA — 404

STORE AVERAGE LINKING PROBABILITIES — 406

400

PROBABILISTIC ACCOUNT LINKING

BACKGROUND

The digital world of e-commerce, payment, banking, and other systems that support online transactions between entities has provided a significant opportunity for fraud. In particular, bad actors can set up multiple accounts on these digital platforms to perform a variety of fraudulent activities. For instance, one particular concern is financial activity associated with collusion or self-payment. This type of activity is often directly linked with money laundering, which is subject to anti-money laundering (AML) regulations that require the online transaction platforms to monitor and possibly report fraudulent activity. In the context of e-commerce platforms, other fraudulent activity perpetuated through multiple accounts includes: sellers who use multiple accounts to create duplicate listings or profit from charge-backs; fraudsters with multiple active accounts attempting fraudulent redemptions of gift cards; and shill bidding, in which a seller bids on his own auction using a second account to drive up the price.

SUMMARY

Some aspects of the present technology relate to, among other things, probabilistic account linking for online transaction platforms to identify accounts that belong to the same entity. In accordance with some configurations, linking strategies are defined for linking accounts on an online transaction platform. Each linking strategy identifies one or more account attributes for which accounts may share the same attribute values. An average linking probability is generated for each linking strategy using account data for accounts on the online transaction platform. The average linking probability for a linking strategy represents a likelihood that two accounts belong to the same entity if the two accounts share the linking strategy. In some aspects, the average linking probability for a given linking strategy is generated as a function of account cluster information in which each account cluster identifies one or more accounts that have been identified as corresponding to a same entity using, for instance, an entity resolution approach. The average linking probabilities for the linking strategies are stored such that they can be used for account linking purposes.

When evaluating whether to link two accounts, linking strategies shared by the two accounts are identified. The shared linking strategies are ones in which the two accounts share the same attribute values for the account attributes for the shared linking strategies. Average linking probabilities for the shared strategies are retrieved, and an account linking probability for the two accounts is generated as a function of those average linking probabilities. The account linking probability represents a likelihood the two accounts belong to the same entity and is used to determine whether to link the two accounts. In some aspects, the account linking probability is compared against a threshold, and the two accounts are linked if the account linking probability satisfies the threshold. One or more actions, such as blocking a transaction between the two accounts or reporting a past transaction between the two accounts, can be taken in response to linking the two accounts.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein:

FIG. 2 is a table showing an example of account clustering information that can be used to generate a linking probability in accordance with some implementations of the present disclosure;

FIG. 3 is a table showing an example of average linking probabilities that can be used to generate an account linking probability for two accounts in accordance with some implementations of the present disclosure;

DETAILED DESCRIPTION

Overview

Figure 1:
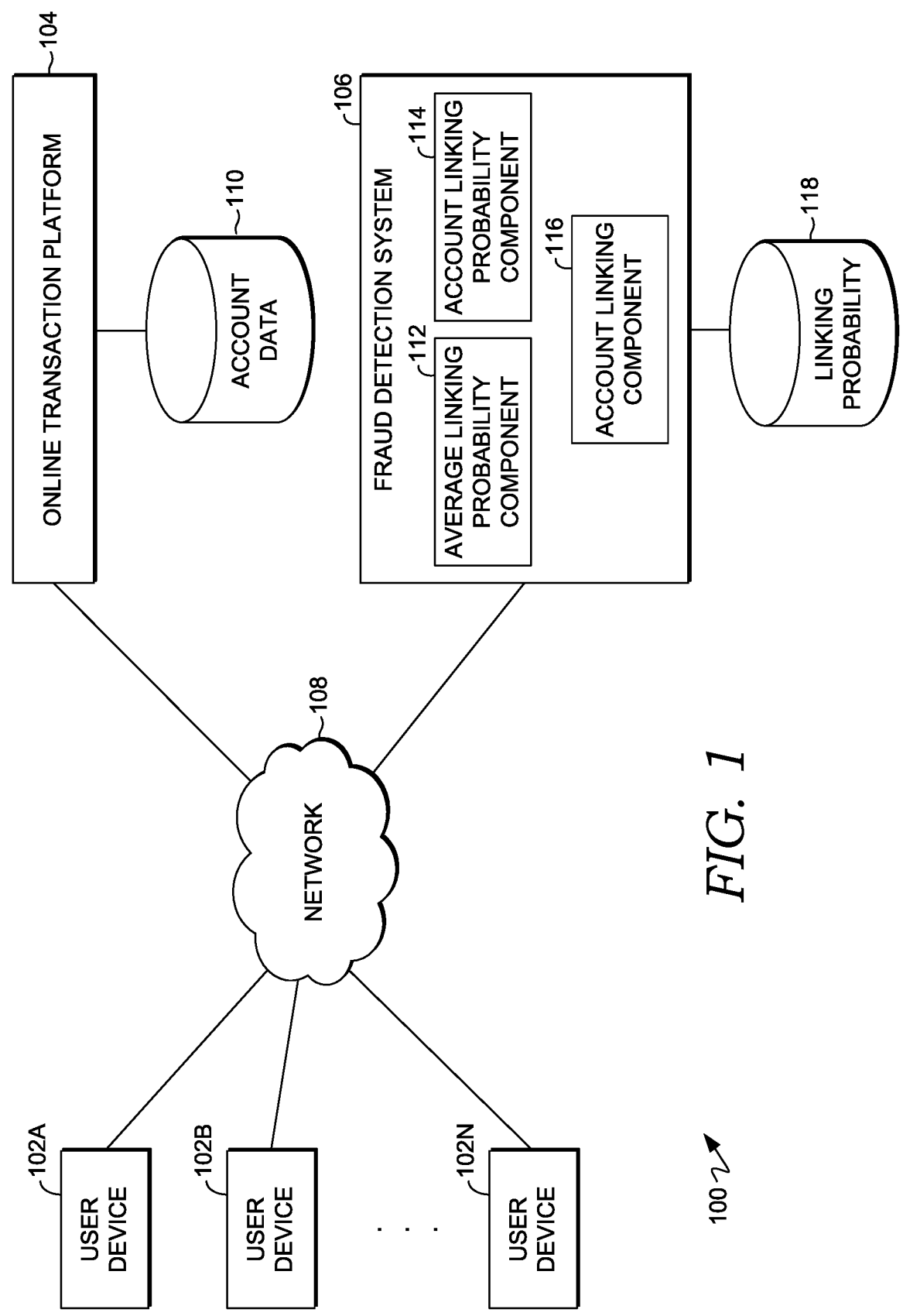
FIG. 1 is a block diagram illustrating an exemplary system in accordance with some implementations of the present disclosure.

The ease with which users can create accounts and perform electronic transactions on online transaction platforms (including, for instance, e-commerce, payment, and banking systems) presents a particular challenge for identifying and combating fraudulent activity at a level that did not exist before the advent of such online platforms. In order to combat fraudulent activity and to comply with anti-money laundering (AML) requirements, online transaction platforms have developed entity resolution techniques that identify when multiple accounts belong to the same entity. Often, deterministic techniques are employed that identify accounts that belong to the same entity with certainty. However, these deterministic approaches tend to be too rigid and miss instances in which accounts should be linked. Among other things, this potentially exposes the online transaction platforms to liability for failure to comply with AML requirements. To address this shortcoming of deterministic entity resolution techniques, some online transaction platforms have used subjective approaches to link accounts. For instance, an approach could be used in which different criteria for linking two accounts are assigned weights according to human judgement. However, such subjective approaches are typically not easily implemented at scale and introduce too much uncertainty.

Aspects of the technology described herein improve the ability of online transaction platforms to identify accounts for linking, for instance, to detect and/or prevent fraud in online transactions perpetrated by entities using multiple accounts. Instead of relying on a deterministic or subjective approach to link accounts, the technology described herein employs a probabilistic linking approach for determining a likelihood that accounts belong to the same entity.

In accordance with some aspects of the technology described herein, linking strategies are defined for evaluating whether to link accounts on an online transaction platform. Each linking strategy identifies one or more account attributes for which accounts may share the same attribute values. For instance, a linking strategy may correspond to IP address, such that two accounts share that IP address linking strategy if the two accounts have the same IP address value. As another example, a linking strategy may correspond to mailing address and credit card number, such that two accounts share that mailing address-credit card linking strategy if the two accounts share the same mailing address value and the same credit card number.

An average linking probability is generated for each linking strategy using account data for accounts on the online transaction platform, and the average linking probabilities for the linking probabilities are stored such that they can be used for account linking purposes. An average linking probability for a linking strategy represents a likelihood that two accounts belong to the same entity if the two accounts share the linking strategy. In accordance with some aspects, multiple average linking probabilities are generated for a given linking strategy where each average linking probability for the linking strategy corresponds with the number of accounts sharing the same linking strategy attribute value. For instance, for the IP address linking strategy, a first average linking probability could be generated for when there are two accounts sharing the same IP address, a second average linking probability could be generated for when there are three accounts sharing the same IP address, a third average linking probability could be generated for when there are four accounts sharing the same IP address, etc. Accordingly, the likelihood that two accounts belong to the same entity for a given linking strategy can vary based on the total number of accounts that share the same linking strategy attribute value with those two accounts.

In some aspects, to generate an average linking probability for a given linking strategy and a given number of accounts sharing the linking strategy attribute value, a linking probability is determined for each of a number of different attribute values for the account attribute(s) of the linking strategy where the given number of accounts share each of those attributes value. The average linking probability for the linking strategy is generated by the given number of accounts as a function of those linking probabilities. For instance, suppose an average linking probability is being generated for the IP address linking strategy when there are six accounts sharing the same IP address value. In this case, IP address values where there are six accounts sharing each of those IP address values in the account data are identified. A linking probability is determined for each of those IP address values, and the average linking probability for the IP address linking strategy for when there are six accounts sharing the same IP address is generated as an average of those linking probabilities.

As will be described in further detail below, the linking probability for a given attribute value of a linking strategy can be determined by identifying accounts having that attribute value, identifying account clusters to which each of those accounts belong, and generating the linking probability as a function of the number of accounts in each cluster and the total number of accounts having the linking strategy attribute value. Each account cluster can comprise one or more accounts that have been identified as belonging to a same entity using, for instance, a deterministic entity resolution approach.

Once generated, the average linking probabilities are used to evaluate whether to link accounts on the online transaction platform. Pairs of accounts can be evaluated for linking for a variety of different applications. By way of example only and not limitation, two accounts can be evaluated at the time of a prospective transaction between the two accounts to determine whether to allow or block the transaction. As another example, two accounts can be evaluated based on a past transaction between the two accounts, for instance, to determine whether to report the transaction for AML purposes. As a further example, an account sharing one or more linking strategies with a fraudulent account (i.e., an account previously identified as participating in fraudulent activity) can be evaluated against that fraudulent account to determine whether the account should be considered fraudulent.

To evaluate two accounts for linking, linking strategies shared by the two accounts are identified. The shared linking strategies are ones in which the two accounts share the same attribute values for the account attributes for the shared linking strategies. For instance, if the two accounts have the same IP address value, the two accounts share the IP address linking strategy. The average linking probabilities for the shared strategies are retrieved, and an account linking probability for the two accounts is generated as a function of those average linking probabilities. In some aspects, the average linking probability retrieved for each shared strategy corresponds to the overall number of accounts that share the same attribute value for that shared strategy. For instance, if two accounts being evaluated share the same IP address value and six accounts in total share that same IP address value, the average linking probability for when six accounts share the same IP address value would be retrieved and used to generate account linking probability for the two accounts.

In some aspects, the account linking probability for two accounts is generated using a recursive function when there are multiple shared linking strategies. In some instances, the shared linking strategies for two accounts can have overlapping account attributes. For instance, two accounts could share an IP address linking strategy and an IP address-credit card linking strategy. In such instances, a subset of shared linking strategies is selected having the linking strategies with the highest average linking probabilities such that the subset does not include any overlapping account attributes.

The account linking probability generated for two accounts is used to determine whether to link the two accounts. In some aspects, the account linking probability is compared against a threshold, and the two accounts are linked if the account linking probability satisfies the threshold. In response to linking the two accounts, one or more actions can be performed. For instance, a notification can be generated and transmitted to a computing device of an administrator who may perform a task based on the notification. As another example, a transaction between the two accounts can be blocked. As yet another example, a past transaction between the two accounts can be reported based on the linking.

While much of the description provided herein focuses on fraud detection/prevention, in further aspects, the probabilistic account linking of the present technology can be used for other applications beyond fraud detection/prevention. By way of example only and not limitation, in some configurations, a recommender system can leverage the probabilistic account linking described herein for recommendation purposes. For instance, accounts across different platforms could be compared to link the accounts and aggregate information regarding a user associated with the accounts for selecting recommendations to provide to the user on one of the platforms. Accordingly, an action taken in response to linking accounts using aspects of the technology described herein can be generating recommendations based on the account linking.

Aspects of the technology described herein provide a number of improvements over existing technologies. For instance, the probabilistic account linking approach described herein identifies accounts that should be linked when those accounts are not deterministically linked. As a result, the technology enables the detection of instances of fraud that are not captured by deterministic approaches. Additionally, the linking approach described herein can be applied not only retroactively to identify fraudulent transactions that have already occurred but can also be used to evaluate whether to block fraudulent transactions before they occur. Furthermore, the technology described herein provides a reproducible approach that can be uniformly applied to any accounts created on an online transaction platform.

Example System for Probabilistic Account Linking

With reference now to the drawings, FIG. 1 is a block diagram illustrating an exemplary system 100 for performing fraud detection through probabilistic account linking in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes any number of user devices 102A-102N, an online transaction platform 104, and a fraud detection system 106. Each of the user devices 102A-102N, the online transaction platform 104, and the fraud detection system 106 shown in FIG. 1 can comprise one or more computer devices, such as the computing device 900 of FIG. 9, discussed below. As shown in FIG. 1, the user devices 102A-102N, the online transaction platform 104, and the fraud detection system 106 can communicate via a network 108, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present technology. Each may comprise a single device or multiple devices cooperating in a distributed environment. For instance, the online transaction platform 104 and the fraud detection system 106 could each be provided by multiple server devices collectively providing the functionality of the online transaction platform 104 and the fraud detection system 106 as described herein. Additionally, other components not shown may also be included within the network environment.

Each of the user devices 102A-102N can be a client device on the client-side of operating environment 100, while the online transaction platform 104 and the fraud detection system 106 can be on the server-side of operating environment 100. The online transaction platform 104 and/or the fraud detection system 106 can each comprise server-side software designed to work in conjunction with client-side software on the user devices 102A-102N so as to implement any combination of the features and functionalities discussed in the present disclosure. For instance, each of the user devices 102A-102N can include an application (not shown) for interacting with the online transaction platform 104 and/or the fraud detection system 106. The application can be, for instance, a web browser or a dedicated application for providing functions, such as interacting with the online transaction platform 104 and/or the fraud detection system 106. This division of operating environment 100 is provided to illustrate one example of a suitable environment, and there is no requirement for each implementation that any combination of the online transaction platform 104 and the fraud detection system 106 remain as separate entities. For instance, in some aspects, the fraud detection system 106 is a part of the online transaction platform 104. While the operating environment 100 illustrates a configuration in a networked environment with separate user devices, online transaction platform, and fraud detection system, it should be understood that other configurations can be employed in which aspects of the various components are combined.

Each of the user devices 102A-102N may comprise any type of computing device capable of use by a user. For example, in one aspect, a user device may be the type of computing device 900 described in relation to FIG. 9 herein. By way of example and not limitation, the user devices 102A-102N may each be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. A different user may be associated with each of the user devices 102A-102N and may interact with the online transaction platform 104 and/or the fraud detection system 106 via the user devices 102A-102N.

The online transaction platform 104 can be implemented using one or more server devices, one or more platforms with corresponding application programming interfaces, cloud infrastructure, and the like. The online transaction platform 104 generally comprises any computer-based system that enables entities to establish accounts and perform electronic transactions over the network 108 via the user devices 102A-102N using the accounts. In some aspects, the online transaction platform 104 comprises a listing platform (e.g., an e-commerce platform) that generally provides, to the user devices 102A-102N, item listings describing items (physical or digital) available for purchase, rent, streaming, download, etc., and facilitates electronic purchase transactions for items between seller accounts and buyer accounts. In other aspects, the online transaction platform 104 comprises a payment platform that facilitates electronic payment transactions between two accounts. In still further aspects, the online transaction platform comprises a banking platform that facilitates the electronic transfer of money between accounts.

As previously indicated, the online transaction platform 104 employs accounts to enable and track user interactions with the online transaction platform, including electronic transactions between accounts. For instance, in the context of a listing platform, a buyer account could be used to browse, search, and purchase items, while a seller account could be used to market and sell items, manage inventory, set pricing, and track sales performance. An account datastore 110 stores information regarding each account on the online transaction platform 104. The account data for each account maintained in the account datastore 110 can include values for each of a number of different account attributes, such as the user's name, email address, mailing address, IP address, credit card, phone number, bank account number, and device identifier. In some aspects, the account data is stored as attribute-value pairs (e.g., name: John Smith; email: jsmith@email.com; etc.). Additionally, the account data for an account can be stored with an account identifier uniquely identifying the account.

At a high level the fraud detection system 106 employs a probabilistic approach to determine whether to link accounts. As shown in FIG. 1, the fraud detection system 106 includes an average linking probability component 112, an account linking probability component 114, and an account linking component 116. The components of the fraud detection system 106 may be in addition to other components that provide further additional functions beyond the features described herein. The fraud detection system 106 can be implemented using one or more server devices, one or more platforms with corresponding application programming interfaces, cloud infrastructure, and the like. While the fraud detection system 106 is shown separate from the online transaction platform 104 and each of the user devices 102A-102N in the configuration of FIG. 1, it should be understood that in other configurations, some of the functions of the fraud detection system 106 can be provided on the online transaction platform 104 and/or a user device 102A-102N.

In some aspects, the functions performed by components of the fraud detection system 106 are associated with one or more applications, services, or routines. In particular, such applications, services, or routines may operate on one or more user devices, servers, may be distributed across one or more user devices and servers, or be implemented in the cloud. Moreover, in some aspects, these components of the fraud detection system 106 may be distributed across a network, including one or more servers and client devices, in the cloud, and/or may reside on a user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The average linking probability component 112 of the fraud detection system 106 generates average linking probabilities for linking strategies using account data from the account datastore 110. Linking strategies can be defined as corresponding to one or more account attributes for evaluating whether to link accounts based on the accounts sharing the same value for each account attribute of the linking strategy. In some cases, a linking strategy identifies a single account attribute. For instance, a linking strategy could consist of the email address attribute, such that two accounts share that linking strategy based on the two accounts having the same email address value. In other cases, a linking strategy identifies two or more account attributes. For instance, a linking strategy could consist of the mailing address attribute and the email address attribute, such that two accounts share that linking strategy based on the two accounts having both the same mailing address value and the same email address value.

An average linking probability for a linking strategy represents a probability that two accounts correspond with the same entity based on the two accounts sharing that linking strategy. For instance, if the average linking probability for a linking strategy consisting of the email address attribute is 20%, two accounts sharing the same email address value can be considered to have a 20% chance of being the same entity based on that linking strategy alone. Different average linking probabilities could be provided for each linking strategy based on the number of accounts sharing the same linking strategy attribute value. For instance, the average linking probability for the email address linking strategy could be 20% when there are four accounts sharing the same email address value, 18% when there are five accounts sharing the same email address value, and 16% when there are six accounts sharing the same email address value.

For a given linking strategy, the average linking probability component 112 determines a linking probability for each unique attribute value for the account attribute of the linking strategy or each unique combination of attribute values when a linking strategy is based on two or more account attributes. The average linking probability component 112 then generates average linking probabilities for the linking strategy as function of the linking probabilities for the unique attribute values and based on the number of accounts sharing each attribute value.

For instance, given a linking strategy based on email address, the average linking probability component 112 calculates the linking probability for each of a number of unique email address values. To generate the average linking probability when four accounts share an email address value, the average linking probability component 112 identifies the linking probability for each of those unique email address values that have four accounts sharing the same email address value. The average linking probability component 112 then averages those linking probabilities to provide the average linking probability for the email address linking strategy for when four accounts share the same email address value. Likewise, to generate the average linking probability when five accounts share an email address value, the average linking probability component 112 identifies the linking probability for each of those unique email address values that have five accounts sharing the same email address value. The average linking probability component 112 then averages those linking probabilities to provide the average linking probability for the email address linking strategy for when five accounts share the same email address value.

As another example, given a linking strategy based on a combination of name and mailing address, the average linking probability component 112 calculates the linking probability for each of a number of unique combinations of name and mailing address values. To generate the average linking probability when four accounts share the same name and mailing address values, the average linking probability component 112 identifies the linking probability for each of those unique combinations of name and mailing address values that have four accounts sharing the same combination of name and mailing address values. The average linking probability component 112 then averages those linking probabilities to provide the average linking probability for the name-mailing address linking strategy for when four accounts share the same name value and the same mailing address value. Likewise, to generate the average linking probability when five accounts share the same name and mailing address values, the average linking probability component 112 identifies the linking probability for each of those unique combinations of name and mailing address values that have five accounts sharing the same combination of name and mailing address values. The average linking probability component 112 then averages those linking probabilities to provide the average linking probability for the name-mailing address linking strategy for when five accounts share the same name value and the same mailing address value.

In accordance with some aspects of the technology described herein, the average linking probability component 112 determines average linking probabilities for linking strategies by leveraging account cluster information for accounts in the account datastore 110. Each account cluster in the account cluster information identifies a group of accounts (e.g., by account identifier) that has been identified with a high level of certainty to correspond with the same entity. The average linking probability component 112 can generate the account clusters or otherwise access account cluster information generated by another component. Any of a variety of different entity resolution techniques could be employed to generate the account clusters, such as, for instance, rule-based matching, exact matching of account attributes, fuzzy matching of account attributes, and machine-learning-based approaches. In some aspects, the account clusters are provided through a deterministic linking process of accounts where it is determined with certainty that multiple accounts belong to the same entity or cluster. In some cases, the cluster information includes clusters in which accounts are grouped together using transitive account linking. For instance, if account A is linked to account B and account B is linked to account C, then, account A will be linked to account C, such that accounts A, B, and C will form an account cluster.

The account cluster information serves as a ground truth for computing the linking probabilities for unique attribute values for linking strategies. To compute the linking probability for a given attribute value of a linking strategy, the average linking probability component 112 accesses account data from the account datastore 110 to identify accounts (e.g., by account identifier) that have that particular attribute value and also identifies the account cluster (e.g., by cluster identifier) to which each of those accounts belongs. In some aspects, the average linking probability component 112 computes the linking probability for a given attribute value for the linking strategy using the following function:

$$P = \sum_{i=1}^{N} \left( m_i * (m_i - 1)/(N * (N-1)) \right) \tag{1}$$

where $m_i$ represents the number of accounts belonging to the same cluster having a cluster identifier of $c_i$, and N is the total number of accounts having the linking strategy attribute value.

By way of example to illustrate, suppose the linking probability is being determined for a linking strategy based on IP address. Given a particular IP address value, accounts having the IP address value are identified, as well as the account clusters to which each of those accounts belongs. FIG. 2 provides a table with example information showing accounts (by account identifier 202) having a given IP address value and the account cluster (by cluster identifier 204) for each of those accounts. In this example, there are a total of six accounts (A, B, C, D, E, F) with that IP address value, and those six accounts fall into three clusters (C1, C2, C3). Here: $m_i$ (the number of accounts) that have cluster identifier of $c_i$ when i=1 is 3 (i.e., accounts A, B, C in cluster C1); $m_i$ (the number of accounts) that have cluster identifier of $c_i$ when i=2 is 2 (i.e., accounts D, E in cluster C2); and $m_i$ (the number of accounts) that have cluster identifier of $c_i$ when i=3 is 1 (i.e., account F in cluster C3). Given equation (1) above, the linking probability for this IP address value is 27%:

$$P = ((3*(3-1)) + (2*(2-1)) + (1*(1-1)))/(6*(6-1)) = 0.27.$$

Put another way, if two of those six accounts were randomly picked (without replacement), the linking probability provides the odds that the pair have the same cluster identifier. In this example, the odds are 0.27 (or just under 1 out of three tries will be a same-cluster pair). This process can be repeated to determine the linking probability for each of a number of unique IP address values that also have six accounts sharing the same IP address value, and the average linking probability for the IP address linking strategy for when six accounts share the same IP address is generated as an average of those linking probabilities.

With reference again to FIG. 1, the average linking probabilities generated by the average linking probability component 112 for different linking strategies are stored in a linking probability datastore 118. In some aspects, each average linking probability is stored in association with a linking strategy identifier that identifies the associated linking strategy and an indicator identifying the number of accounts sharing the linking strategy attribute value.

The account linking probability component 114 uses the average linking probabilities stored in the linking probability datastore 118 to determine account linking probabilities between pairs of accounts. The account linking probability for a pair of accounts represents the likelihood the two accounts belong to the same entity and is used to determine whether to link the accounts, as will be described in further detail below. The account linking probability for two accounts can be determined at different times to serve different fraud detection and prevention purposes. For instance, in some aspects, the presence of a past transaction between two accounts (with or without certain conditions, such as transactions over a certain monetary amount (e.g., over $2000)) could trigger generating an account linking probability to determine whether to link the accounts. As another example, an account linking probability between two accounts could be generated at the time of a prospective transaction to determine whether to prevent or otherwise block the transaction. In a further example, an account linking probability could be periodically generated for all pairs of accounts in the account datastore 110 that share one or more linking strategies to determine whether to link the accounts. As yet another example, account linking probabilities could be generated for any accounts sharing one or more linking strategies with fraudulent accounts (i.e., accounts that have been associated with fraudulent activity) to determine whether to also identify those accounts as fraudulent.

Given a pair of accounts, the account linking probability component 114 identifies linking strategies shared by the two accounts. A shared linking strategy for two accounts comprises one in which the two accounts have the same attribute value for the attribute of the linking strategy (or the same attribute values for a combination of attributes). For instance, an IP address linking strategy would be identified as a shared linking strategy if the two accounts share the same IP address value. As another example, a name-mailing address linking strategy would be identified as a shared linking strategy if the two accounts share the same name value and the same mailing address value.

For each shared linking strategy for the pair of accounts, the account linking probability component 114 retrieves the average linking probability based on the total number of accounts sharing the same attribute value for the shared linking strategy. For instance, the account linking probability component 114 can perform a lookup in the linking probability datastore 118 based on linking strategy identifier for each shared linking strategy and the total number of accounts sharing the linking strategy attribute value to retrieve the corresponding average linking probability. For instance, if two accounts share the same IP address value (among other shared linking strategies) and a total of six accounts share that same IP address value, the average linking probability for when six accounts share the same IP address value would be retrieved.

The account linking probability component 114 generates an account linking probability for the pair of accounts using the retrieved average linking probabilities, if any. If there are no shared linking strategies, the account linking probability is zero. If there is only a single shared linking strategy, the account linking probability is equal to the average linking probability for that shared linking strategy. If there are multiple shared linking strategies, the account linking probability is generated as a function of those shared linking strategies.

In some aspects, the account linking probability component 114 uses a recursion to determine the account linking probability for pair of accounts with multiple shared linking strategies. For instance, the following recursive function can be employed:

$$P[n] = P[n-1] + (1 - P[n-1]) * b[n] \qquad (2)$$

where P[n] represents the account linking probability for n shared linking strategies and b[n] represents the average linking probability for the $n^{th}$ shared linking strategy.

By way of example to illustrate, suppose a pair of accounts have three shared linking strategies with average linking probabilities as follows: phone=0.5; bank account=0.33; and IP address=0.02. The account linking probability for the two accounts would be computed recursively using the above equation (2), as follows:

$$P[0] = 0$$
$$P[1] = P[0] + (1 - P[0]) * b[1] = 0 + (1 - 0) * 0.5 = 0.5$$
$$P[2] = P[2-1] + (1 - P[2-1]) * b[2] = 0.5 + (1 - 0.5) * 0.33 = 0.665$$
$$P[3] = P[3-1] + (1 - P[3-1])^* b[3] = 0.665 + (1 - 0.665) * .02 = 0.6717$$

Accordingly, in this example, the account linking probability for the two accounts based on the two accounts sharing the three linking strategies (phone, bank account, and IP address) is 67.17%. This computation treats the linking probability between shared linking strategies as independent events.

In instances in which linking strategies include multiple account attributes, the linking strategies shared by two accounts could have overlapping account attributes. For instance, suppose two accounts have the following shared linking strategies: email address-mailing address; email address; IP address; mailing address-credit card; mailing address-IP address; phone number, device identifier; and bank account. In that example, there are shared linking strategies with overlapping account attributes—three linking strategies include mailing address, two linking strategies include email address, two linking strategies include IP address. In such a case, a subset of shared linking strategies is selected such that there are no overlapping account attributes in the subset, and the account linking probability for the two accounts is determined using the selected subset of shared linking strategies.

In some aspects, a subset of shared linking strategies can be selected from an overall set of shared linking strategies with overlapping account attributes by selecting the linking strategies with the highest average linking probabilities to cover each account attribute included the shared linking strategies without any overlapping account attributes across the selected subset. This could include, for instance, performing a primary sort of the set of shared linking strategies by descending order of average linking probabilities and then performing a secondary sort by lexicographical order of the account attributes of the linking strategies. The subset of linking strategies could then be determined by going through the ordered list starting at the highest average linking probability and iteratively selecting linking strategies with account attributes that have not yet been included in a previously selected linking strategy, while excluding linking strategies that include an account attribute from a previously selected linking strategy.

By way of illustration, FIG. 3 provides an example of shared linking strategies 306 for a pair of accounts 302 and the corresponding average linking probabilities 304. In this example, there are eight linking strategies shared by account pair A-B, including five linking strategies based on a single account attribute and three linking strategies based on a combination of two account attributes. Performing a first sort based on average linking probability and a second sort based on lexicographical order provides the following sorted set: S1=[(0.97,email-address), (0.5,phone), (0.4,address-credit card), (0.33,bank account), (0.3,address-IP address), (0.02,IP address), (0.02,machine id), (0.1,email)]. Using this sorted set, the following linking strategies are selected: email-address; phone; bank account; IP address; and machine ID. The email, address-credit card, and address-IP address linking strategies would be excluded as they each include an account attribute included in a previously selected linking strategy. For instance, the email linking strategy would be excluded since the email attribute is included in the previously selected email-address linking strategy. In some configurations, between IP address and machine ID linking strategies, IP address will be selected when lexicographically sorted as higher than machine ID. The account linking probability would then be determined as a function of the average linking probabilities of the selected subset of linking strategies, for instance, using the recursion approach discussed above.

The following provides an example algorithm that can be employed by the account linking probability component 114 to determine the account linking probability for a pair of accounts:

ciating the two accounts and causing an action to be performed. The linking could include storing information (e.g., in the account datastore 110 or other database) associating the two accounts to identify the accounts as being linked.

A number of different actions can be taken for linked accounts, and the type of action taken can depend on the particular fraud detection application. For instance, in some aspects, the action can comprise generating a notification via one or more user interfaces that identify the linked accounts and may provide data regarding the accounts. The notification can be communicated over the network 108 to a device associated with the administrator. Such notification allows the administrator to review the linked accounts and determine whether to manually close one or both accounts, report a transaction between the two accounts, or perform some other fraud-related task. In other aspects, an automatic action is taken based on two accounts being linked. For instance, in the case of a prospective transaction, the account linking component 116 can cause the online transaction platform 104 to block or otherwise prevent the transaction from being completed. In the case of a past transaction, the account linking component 116 can automatically trigger a

```
def final_probability_calculator(S1):
    token=[ ] ## define empty array for collecting linking strategies
    token_prb=[ ] ## define empty array for collecting average linking probabilities
Find the strategies and probabilities which should be used for final combination
probability calculation.
for x in S1:
    key = str(x[1])
    value = Decimal(str(x[0]))
    print ('This is my key(strategy) and value(average probability) pair: ' )
    print ('key: '+ str(key) + 'value: '+ str(x[0]))
If single strategy then directly check if exists in token array,
otherwise if double strategy split in singles and check if exists
in token array. If it does not exist, add key to the token array
and add probability to the token_prb array
    if (key in token) or ((len(key.split('|'))==2 and key.split('|')[0] in token) or
        (len(key.split('|'))==2 and key.split('|')[1] in token)) :
        print (key+' exists in token array, cannot use '+key)
    elif len(key.split('|'))==2:
        token.append(key)
        token.append(key.split('|')[0])
        token.append(key.split('|')[1])
        token_prb.append(Decimal(value))
    elif len(key.split('|'))==1:
        token.append(key)
        token_prb.append(value)
Resultant set: S2=[ (0.97,email-address), (0.5,phone), (0.33,bank account), (0.02,IP address) ]
Calculate combined probability from set S2 which is stored in token_prb array here
    comb_prb=Decimal('0.0000')
    i=0
    j=0
    if len(token_prb) > 1:
        print('token_prb: '+ str(token_prb))
        for i in range(len(token_prb)):
            for j in range(1,len(token_prb)):
                if j==i+1:
                    if i==0:
                        comb_prb=(token_prb[i]+token_prb[j])-(token_prb[i]*token_prb[j])
                    else:
                        comb_prb=(comb_prb+token_prb[j])-(comb_prb*token_prb[j])
    elif len(token_prb) == 1 :
        comb_prb=token_prb[0]
Return combined probability comb_prb
    if format(comb_prb, '.2f')=='1.00':
        comb_prb=Decimal(.99)
return format(comb_prb, '.2f')
```

The account linking component 116 determines whether to link pairs of accounts based on their account linking probabilities determined by the account linking probability component 114. Linking accounts generally comprises assofraudulent transaction report for AML or other purposes. As another example, the account linking component 116 can cause the online transaction platform 104 to close one or both accounts.

In some aspects, the account linking component 116 uses a threshold to determine whether to link accounts. For a given pair of accounts, the account linking component 116 compares the account linking probability determined for the accounts with the threshold. If the account linking probability satisfies the threshold, the accounts are linked. The threshold used by the account linking component 116 can vary based on the fraud detection application. For instance, applications that automatically prevent prospective transactions from being completed could use one threshold, while applications that automatically close an account could use a different threshold. In further aspects, multiple thresholds can be used to cause different actions to be taken. This allows elevated types of actions to be taken based on the strength of the account linking probability for a pair of accounts. For instance, if a first lower threshold is met, the accounts are linked and a notification is provided to an administrator; and if a second higher threshold is met, the accounts are linked and automatically closed. In some cases, all types of actions for which a threshold has been met by the account linking probability for a pair of accounts could be taken. For instance, if two thresholds are met for a given pair of accounts, both associated actions are taken (e.g., reporting to an administrator and automatically closing one or both accounts). In further aspects, a single threshold can cause multiple actions to be performed.

Example Methods for Probabilistic Account Linking

Figure 4:
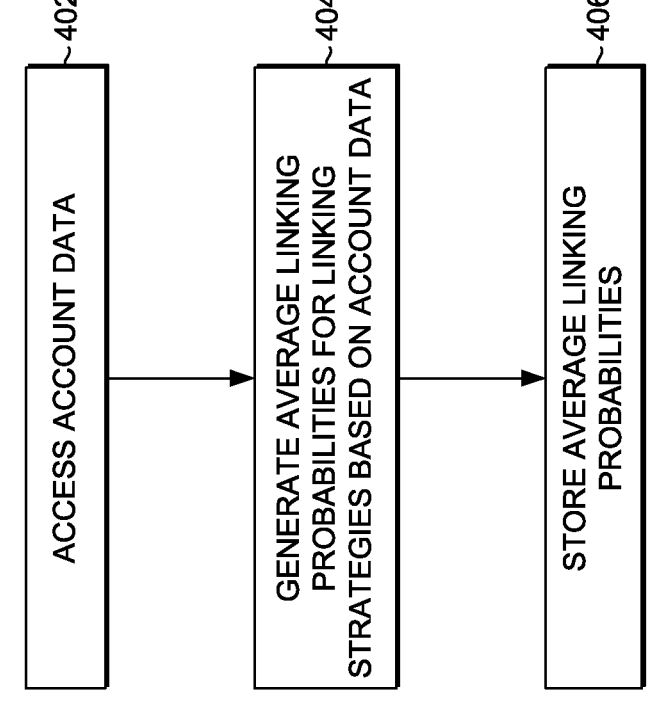
FIG. 4 is a flow diagram showing an overall method for generating average linking probabilities in accordance with some implementations of the present disclosure.
Figure 4:
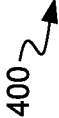

With reference now to FIG. 4, a flow diagram is provided that illustrates an overall method 400 for generating average linking probabilities. The method 400 can be performed, for instance, by the average linking probability component 112 of the fraud detection system 106 of FIG. 1. Each block of the method 400 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 402, account data is accessed. The account data can be accessed, for instance, from an account datastore associated with an online transaction platform (e.g., the account datastore 110 associated with the online transaction platform 104 of FIG. 1). The account data includes data associated with each of a number of accounts on the online transaction platform, including attribute values for account attributes of each account.

Average linking probabilities for a number of linking strategies are generated based on the account data, as shown at block 404. Each linking strategy corresponds with a single account attribute from accounts in the account data or a combination of two or more account attributes. In some aspects, multiple average linking probabilities are generated for each linking strategy, where each average linking probability for a linking strategy corresponds to number of accounts sharing a same linking strategy attribute value.

The average linking probabilities are stored, as shown at block 406. The average linking probabilities can be stored, for instance, in a datastore (e.g., the linking probability datastore 118 of FIG. 1). To facilitate lookup, each average linking probability can be stored with a linking strategy identifier for a corresponding linking strategy and an indication of number of accounts sharing a same linking strategy attribute value.

Figure 5:
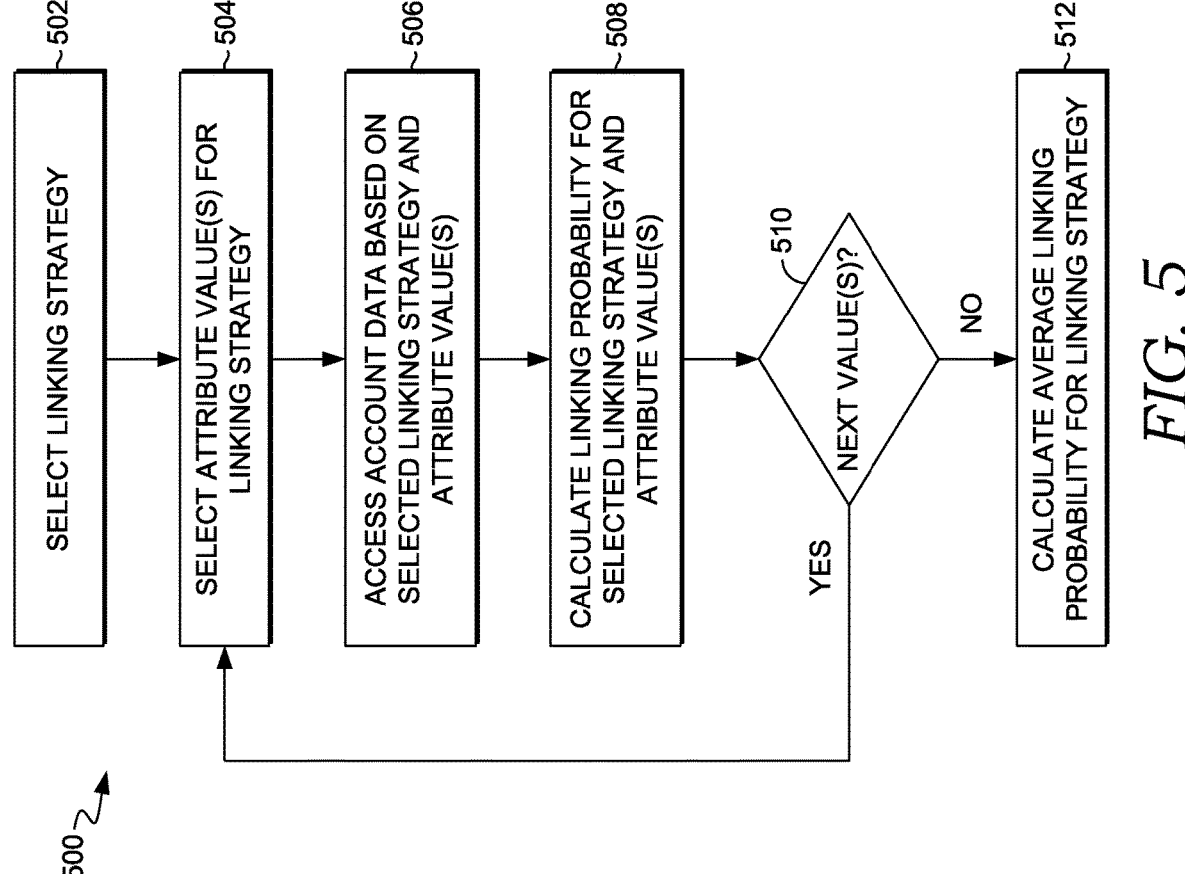
FIG. 5 is a flow diagram showing a method for generating an average linking probability for a selected linking strategy in accordance with some implementations of the present disclosure.

FIG. 5 provides a flow diagram showing one method 500 for generating an average linking probability for a linking strategy that could be performed at block 404 of FIG. 4. The method 500 can be performed, for instance, by the average linking probability component 112 of FIG. 1. As shown at block 502, a linking strategy is selected. The selected linking strategy corresponds with one or more account attributes.

At block 504, a single attribute value is selected in the case of the selected linking strategy corresponding with a single account attribute, or a combination of attribute values is selected in the case of the selected linking strategy corresponding with multiple account attributes. For instance, if the linking strategy corresponds with IP address, a particular IP address value is selected; while if the linking strategy corresponds with IP address and email address, a combination of a particular IP address value and a particular email address value is selected.

Account data is accessed based on the selected linking strategy and selected attribute value(s), as shown at block 506. In particular, accounts that have the selected attribute value(s) for the account attribute of the selected linking strategy are identified. Additionally, account cluster information is accessed for each of those identified accounts. The cluster information generally identifies an account cluster to which each of the identified accounts belongs, for instance, by cluster identifiers. In some aspects, accessing the cluster information can comprise performing account clustering to generate the account cluster information, or otherwise accessing previously generated account cluster information (e.g., stored in the account datastore 110 of FIG. 1).

As shown at block 508, a linking probability is generated for the selected linking strategy and selected attribute value (s) using the account data, including the cluster information for the accounts identified as having the selected attribute value(s). In some aspects, the linking probability is generated using equation (1) provided hereinabove.

A determination is made at block 510 regarding whether another attribute value (or combination of attribute values) for the selected linking strategy is available. If so, the process of blocks 502-508 is repeated to generate the linking probability for the next selected attribute value(s). While FIG. 5 shows a configuration in which linking probabilities for attribute value(s) of the selected linking strategy are generated serially, it should be understood that linking probabilities can be generated in parallel. In some aspects, all attribute values corresponding with a selected linking strategy that are available in the account data are processed. In other aspects, only a subset (e.g., a random selection) of attribute values are selected for processing.

Once linking probabilities have been generated for different attribute value(s), an average linking probability for the selected linking strategy is generated as a function of the linking probabilities of the different attribute value(s), as shown at block 512. For instance, the average linking probability can be generated as an average of the linking probabilities generated for the different attribute value(s) for the selected linking strategy. In some aspects, different average linking probabilities are generated for the linking strategy, where each average linking probability corresponds to a number of accounts sharing a same linking strategy attribute value (or combination of attribute values).

Figure 6:
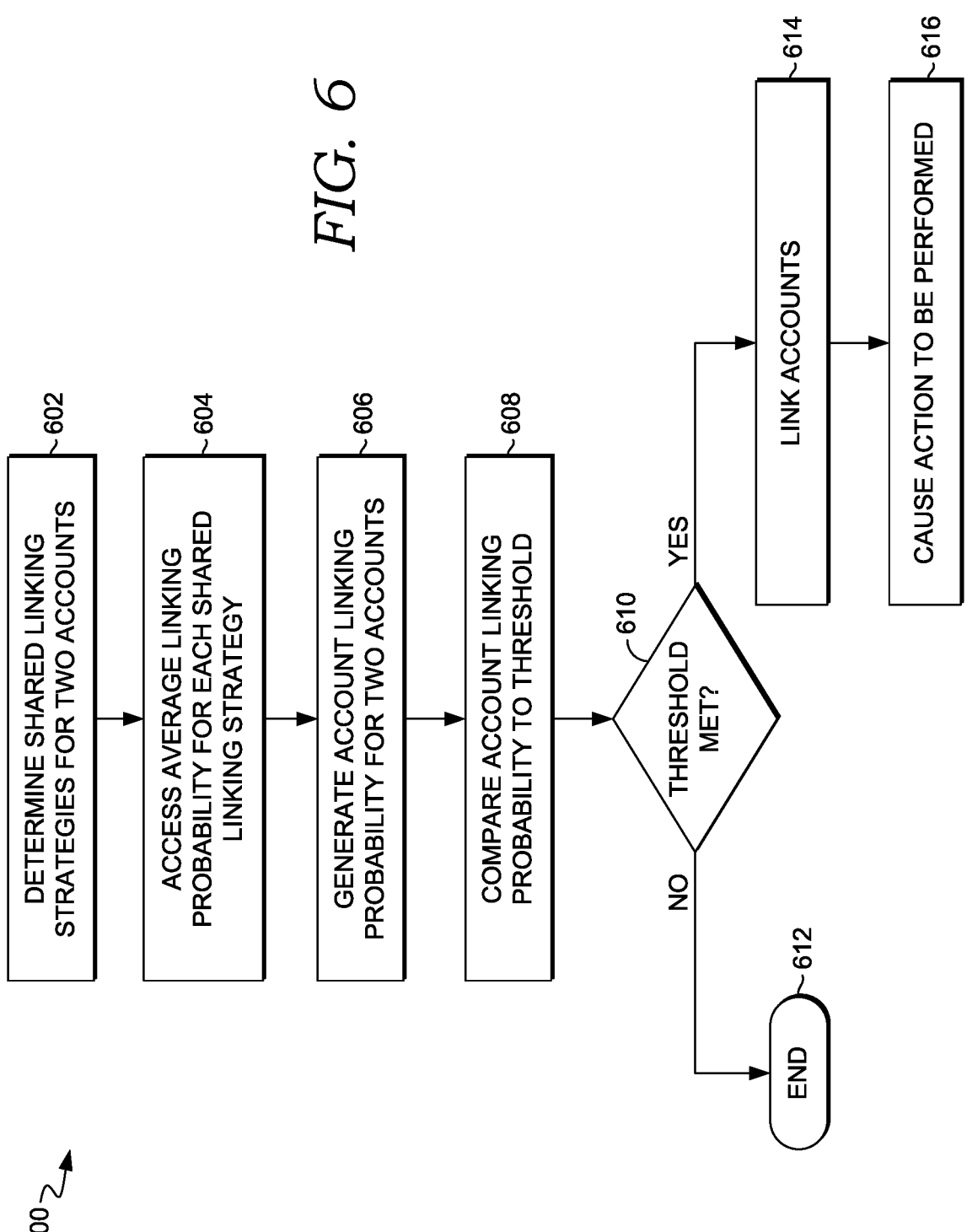
FIG. 6 is a flow diagram showing a method for performing fraud detection using an account linking probability between two accounts in accordance with some implementations of the present disclosure.

Turning next to FIG. 6, a flow diagram is provided showing a method 600 for performing fraud detection using an account linking probability for a pair of accounts. The method 600 can be performed, for instance, by the account linking probability component 114 and the account linking component 116 of FIG. 1. The method 600 can be performed in the context of any of a variety of different fraud detection applications, such as for instance, determining whether to block a prospective transaction between the two accounts, determining whether to report a past transaction between the two accounts, determining whether to close one or both accounts, as well as a number of other applications.

As shown at block 602, one or more shared linking strategies between the two accounts are identified. Identification of the shared linking strategies can be performed by comparing attribute values of the two accounts to determine linking strategies for which the two accounts share the same attribute value (in the case of linking strategies with a single attribute) or the same combination of attribute values (in the case of linking strategies with a combination of two or more attributes).

An average linking probability for each of the shared linking strategies is accessed at block 604. This could include performing a lookup (e.g., in the linking probability datastore 118 of FIG. 1) using a linking strategy identifier for each shared linking strategy to retrieve the average linking probability corresponding to each shared linking strategy based on the total number of account sharing the same linking strategy attribute value.

As shown at block 606, an account linking probability is generated for the two accounts using the average linking probability for each shared linking strategy. The account linking probability is compared against a threshold at block 608, and a determination is made at block 610 regarding whether the threshold is met by the account linking probability. If the threshold is not satisfied, the two accounts are not linked and the process ends, as shown at block 612. Alternatively, if the threshold is satisfied, the two accounts are linked, as shown at block 614. Additionally, an action is taken based on the two accounts being linked, as shown at block 616. Any of a variety of different fraud detection/ prevention actions can be taken, such as for instance, generating and providing a notification regarding the linked accounts, blocking a prospective transaction, reporting a previous transaction, or closing one or both accounts.

Figure 7:
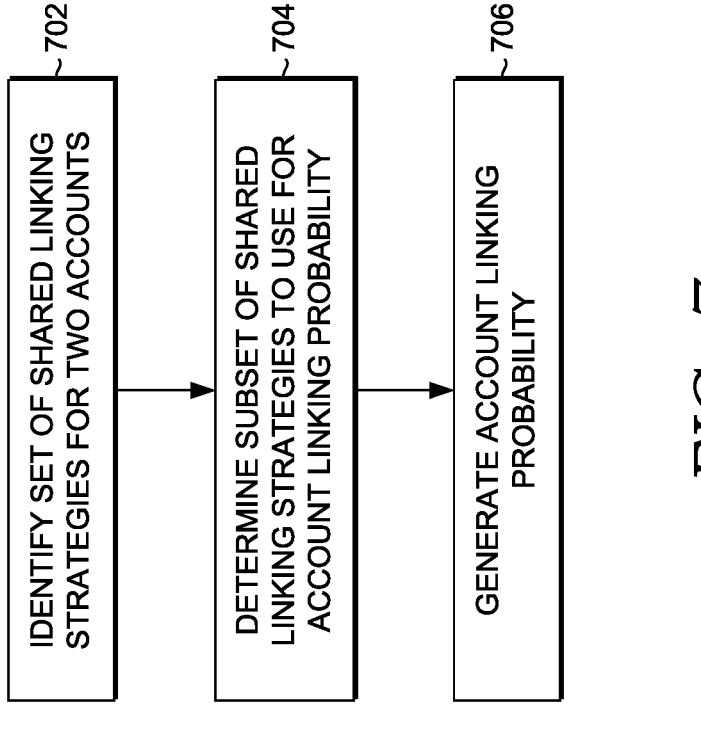
FIG. 7 is a flow diagram showing a method for generating an account linking probability between two accounts in accordance with some implementations of the present disclosure.

FIG. 7 provides a flow diagram showing one method 700 for generating an account linking probability for two accounts when the accounts share multiple linking strategies. The method 700 can be performed, for instance, by the account linking probability component 114 of FIG. 1. As shown at block 702, a set of shared linking strategies for the two accounts are identified. Identification of the shared linking strategies can be performed by comparing attribute values of the two accounts to determine linking strategies for which the two accounts share the same attribute value (in the case of linking strategies with a single attribute) or the same combination of attribute values (in the case of linking strategies with a combination of two or more attributes).

A subset of shared linking strategies to use for generating an account linking probability for the two accounts is determined, as shown at block 704. The subset of shared linking strategies can be determined by selecting shared linking strategies with the highest average linking probabilities that eliminate any overlapping account attributes across the subset of linking strategies. This could include sorting the shared linking strategies by average linking probability and, starting at the highest average linking probability, iteratively selecting shared linking strategies that do not include an account attribute from a shared linking strategy previously selected for the subset. In this way, shared linking strategies that include an account attribute from a shared linking strategy previously selected for the subset are excluded from the subset. In instances in which the set of shared linking strategies for the two accounts do not include any overlapping account attributes, the subset of shared linking strategies can include all shared linking strategies.

As shown at block 706, an account linking probability is generated for the two accounts using the average linking probabilities of the subset of shared linking strategies. If the subset only includes a single shared linking strategy, the account linking probability can be the average linking probability for that shared linking strategy. If the subset includes multiple shared linking strategies, the account linking probability can be generated, for instance, using a recursive function, such as using equation (2) discussed hereinabove.

Figure 8:
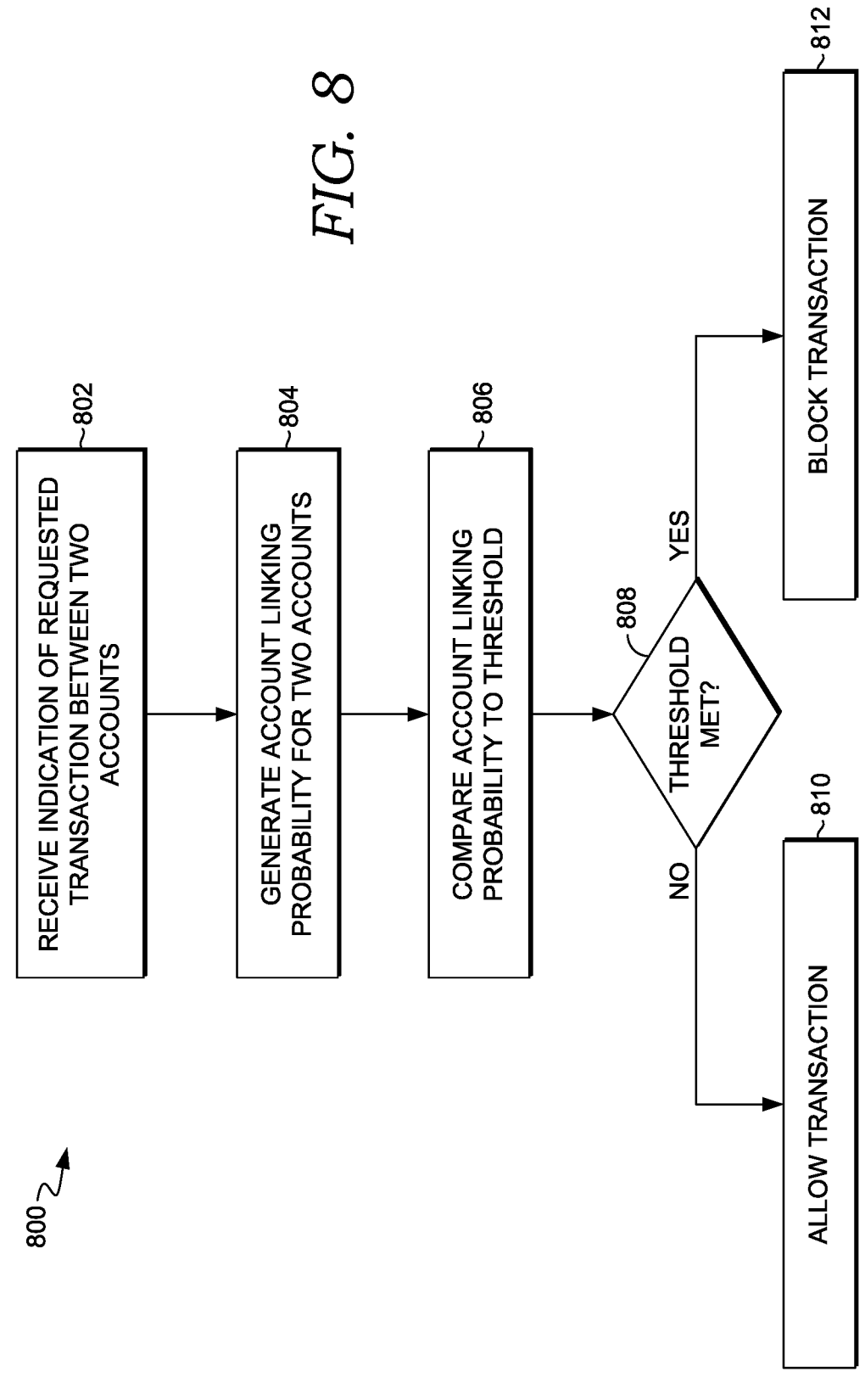
FIG. 8 is a flow diagram showing a method for performing fraud detection at the time of an attempted transaction in accordance with some implementations of the present disclosure.

With reference next to FIG. 8, a flow diagram is provided showing a method 800 for using an account linking probability to determine whether to prevent a transaction between two accounts on an online transaction platform. The method 800 can be performed, for instance, by the fraud detection system 106 in conjunction with the online transaction platform 104 of FIG. 1. As shown at block 802, an indication of a requested transaction between two accounts on an online transaction platform is received. This could be, for instance, a purchase transaction on an e-commerce platform, a payment transaction on a payment platform, a money transfer on a banking platform, or other transaction between the two accounts on an online transaction platform.

In response to the indication of the requested transaction, an account linking probability is generated for the two accounts, as shown at block 804. This could include identifying shared linking strategies for the two accounts, retrieving average linking probabilities for the shared linking strategies based on a total number of accounts sharing a same linking strategy attribute value for each shared linking strategy, and generating the account linking probability as a function of the average linking probabilities for the shared linking strategies.

The account linking probability is compared against a threshold at block 806, and a determination is made regarding whether the account linking probability satisfies the threshold at block 808. If the account linking probability does not satisfy the threshold, the transaction is allowed to proceed, as shown at block 810. Alternatively, if the account linking probability does satisfy the threshold, the transaction is blocked by preventing the transaction from being processed, as shown at block 812. In some aspects, one or more other actions can be performed based on blocking the transaction, such as closing the accounts or providing a notification regarding the blocked transaction to an administrator.

Exemplary Operating Environment

Figure 9:
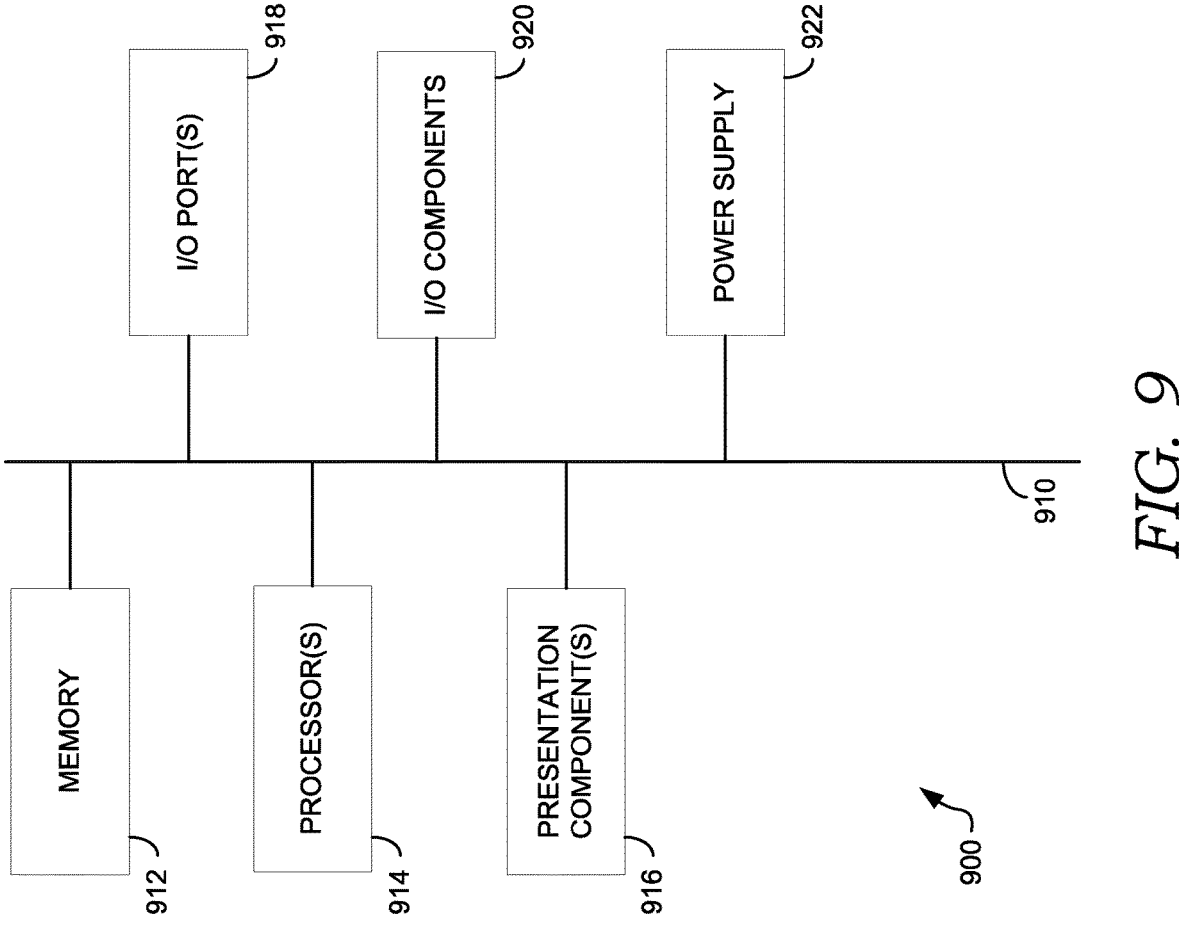
FIG. 9 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 9 in particular, an exemplary operating environment for implementing embodiments of the present technology is shown and designated generally as computing device 900. Computing device 900 is but one example of a suitable computing environment and is not intended to suggest any limitation as to the scope of use or functionality of the technology. Neither should the computing device 900 be interpreted as having any dependency or requirement relating to any one or combination of components illustrated.

The technology can be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 9, computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what can be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 9 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. The terms "computer storage media" and "computer storage medium" do not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory can be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which can be built in. Illustrative components include a microphone, joystick, game pad, satellite dish, scanner, printer, wireless device, etc. The I/O components 920 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 900. The computing device 900 can be equipped with depth cameras, such as, stereoscopic camera systems, infrared camera systems, RGB camera systems, and combinations of these for gesture detection and recognition. Additionally, the computing device 900 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more computer storage media storing computer-usable instructions that, when used by one or more computing devices, cause the one or more computing devices to perform operations, the operations comprising:

generating, by at least one of one or more servers of an online transaction platform, an average linking probability for each linking strategy from a plurality of linking strategies to provide a plurality of average linking probabilities, each linking strategy identifying a different combination of one or more attributes for assessing whether to link pairs of accounts on the online transaction platform based on whether the pairs of accounts share an attribute value for each of the one or more attributes, and wherein each average linking probability is generated by analyzing account data for a plurality of accounts on the online transaction platform to determine, for each linking strategy, a likelihood that accounts sharing attribute values correspond to the same entity based on observed associations among accounts in the account data;

storing, by at least one of the one or more servers, the plurality of average linking probabilities in a data store;

determining, by at least one of the one or more servers, one or more linking strategies shared by two accounts based on attribute values of attributes shared by the two accounts;

retrieving, from the data store by at least one of the one or more servers, the average linking probability for each of the one or more linking strategies shared by the two accounts;

generating, by at least one of the one or more servers, an account linking probability for the two accounts using the average linking probability for each of the one or more linking strategies shared by the two accounts;

performing, by at least one of the one or more servers, a comparison of the account linking probability for the two accounts to a threshold to determine whether to link the two accounts; and responsive to determining to link the two accounts based on the comparison, causing, by at least one of the one or more servers, an action to be performed on the online transaction platform, the action comprising at least one of generating and providing a notification regarding linking of the two accounts, blocking a prospective transaction, reporting a previous transaction, or closing at least one of the two accounts.

2. The one or more computer storage media of claim 1, wherein the plurality of average linking probabilities includes a first set of average linking probabilities for a first linking strategy, each average linking probability from the first set of average linking probabilities for the first linking strategy corresponding to a different number of accounts sharing a same attribute value for the first linking strategy.

3. The one or more computer storage media of claim 2, wherein the two accounts share the first linking strategy, and wherein retrieving the average linking probability for each of the one or more linking strategies shared by the two accounts comprises:

retrieving a first average linking probability from the first set of average linking probabilities for the first linking strategy based on a total number of accounts sharing an attribute value of the first linking strategy with the two accounts.

4. The one or more computer storage media of claim 1, wherein generating the average linking probability for a first linking strategy from the plurality of linking strategies comprises:

determining, for each attribute value of a plurality of attribute values for the first linking strategy in the account data, a linking probability to provide a plurality of linking probabilities for the first linking strategy; and generating the average linking probability for the first linking strategy using the plurality of linking probabilities for the first linking strategy.

5. The one or more computer storage media of claim 4, wherein determining the linking probability for a first attribute value of the plurality of attribute values for the first linking strategy comprises:

identifying a subset of accounts having the first attribute value for the first linking strategy;

accessing account cluster information for the subset of accounts; and determining the linking probability for the first attribute value of the first linking strategy as a function of a number of accounts in each account cluster in the account cluster information and a total number of accounts in the subset of accounts.

6. The one or more computer storage media of claim 1, wherein the two accounts share two or more linking strategies, and wherein generating the account linking probability for the two accounts comprises:

selecting a subset of the two or more linking strategies with non-overlapping account attributes; and generating the account linking probability for the two accounts as a function of the subset of the two or more linking strategies.

7. The one or more computer storage media of claim 6, wherein selecting the subset of the two or more linking strategies with non-overlapping account attributes comprises:

sorting the two or more linking strategies in descending order of average linking probabilities; and iteratively evaluating the two or more linking strategies in the descending order of average linking probabilities to determine whether to include the linking strategy at each iteration in the subset of the two or more linking strategies, wherein a linking strategy evaluated at an iteration is included in the subset of the two or more linking strategies if the linking strategy does not correspond with an account attribute of a linking strategy previously selected for the subset of the two or more linking strategies.

8. The one or more computer storage media of claim 1, wherein causing the action to be performed responsive to determining to link the two accounts comprises blocking a prospective transaction by preventing an electronic transaction between the two accounts on the online transaction platform.

9. The one or more computer storage media of claim 1, wherein causing the action to be performed responsive to determining to link the two accounts comprises providing a notification regarding linking of the two accounts by communicating, over a network to a remote computing device, a user interface that presents an indication that the two accounts have been linked.

10. A computer-implemented method comprising:

generating, by at least one of one or more servers of an online transaction platform, an average linking probability for each linking strategy from a plurality of linking strategies using account data for a plurality of accounts on an online transaction platform, each linking strategy identifying a different combination of one or more attributes for assessing whether to link pairs of accounts on the online transaction platform based on whether the pairs of accounts share an attribute value for each of the one or more attributes, wherein a first average linking probability for a first linking strategy is generated by:

determining a linking probability for each attribute value from a plurality of attribute values for an account attribute corresponding to the first linking strategy using account cluster information identifying account clusters, wherein a same number of accounts have each attribute value from the plurality of attribute values for the account attribute corresponding to the first linking strategy, and generating the first average linking probability for the first linking strategy as a function for the linking probabilities for the plurality of attributes values for the account attribute corresponding to the first linking strategy;

storing, by at least one of the one or more servers, the average linking probabilities for the plurality of linking strategies in a data store, wherein each average linking probability is stored in association with a linking strategy identifier and an indication of a number of accounts sharing a same linking strategy attribute value;

generating, by at least one of the one or more servers, an account linking probability for two accounts on the online transaction platform using one or more of the average linking probabilities in the data store; and responsive to determining to link the two accounts based on the account linking probability for the two accounts, causing, by at least one of the one or more servers, an action to be performed on the online transaction platform, the action comprising at least one of generating and providing a notification regarding linking of the two accounts, blocking a prospective transaction, reporting a previous transaction, or closing at least one of the two accounts.

11. The computer-implemented method of claim 10, wherein determining the linking probability for a first attribute value of the plurality of attribute values for the account attribute corresponding to the first linking strategy comprises:

identifying a subset of accounts having the first attribute value for the account attribute corresponding to the first linking strategy;

determining, from the account cluster information, an account cluster for each account in the subset of accounts; and determining the linking probability for the first attribute value for the account attribute corresponding to the first linking strategy as a function of a number of accounts in each account cluster and a total number of accounts in the subset of accounts.

12. The computer-implemented method of claim 10, wherein the two accounts are linked based on a comparison of the account linking probability for the two accounts against a threshold.

13. The computer-implemented method of claim 10, wherein generating the account linking probability for the two accounts comprises:

identifying one or more linking strategies shared by the two accounts and a total number of accounts sharing each of the one or more linking strategies;

retrieving, from the data store, the average linking probability for each of the one or more linking strategies based on the total number of accounts sharing each of the one or more linking strategies; and generating the account linking probability for the two accounts as a function of the average linking probability for each of the one or more linking strategies.

14. The computer-implemented method of claim 13, wherein the two accounts share two or more linking strategies, and wherein generating the account linking probability for the two accounts comprises:

selecting a subset of the two or more linking strategies having the highest average linking probabilities without overlapping account attributes.

15. The computer-implemented method of claim 13, wherein the two accounts share two or more linking strategies, and wherein the account linking probability is generated for the two accounts using a recursive function.

16. The computer-implemented method of claim 10, wherein causing the action to be performed comprises blocking a prospective transaction by preventing an electronic transaction between the two accounts on the online transaction platform.

17. A computer system comprising:

one or more processors; and one or more computer storage medium storing computer-usable instructions that, when used by the one or more processors, causes the computer system to perform operations comprising:

generating, by at least one server of one or more servers of an online transaction platform, an account linking probability for two accounts on the online transaction platform by:

identifying, from a plurality of linking strategies, one or more linking strategies shared by the two accounts, each linking strategy identifying a different combination of one or more attributes for assessing whether to link pairs of accounts on the online transaction platform based on whether the pairs of accounts share an attribute value for each of the one or more attributes, retrieving, from a data store storing an average linking probability for each linking strategy from the plurality of linking strategies, an average linking probability corresponding to each linking strategy from the one or more linking strategies shared by the two accounts based on a total number of accounts sharing each linking strategy with the two accounts, wherein the average linking probabilities for the plurality of linking strategies were generated using account cluster information for a plurality of accounts on the online transaction platform, and generating the account linking probability for the two accounts using the average linking probability corresponding to each linking strategy from the one or more linking strategies shared by the two accounts;

linking the two accounts based on the account linking probability; and causing, by at least one of the one or more servers, one or more actions to be performed on the online transaction platform responsive to linking the two accounts, the one or more actions comprising at least one of generating and providing a notification regarding linking of the two accounts, blocking a prospective transaction, reporting a previous transaction, or closing at least one of the two accounts.

18. The computer system of claim 17, wherein the account linking probability is generated in response to a request for a transaction between the two accounts; and wherein the one or more actions comprise not allowing the transaction.

19. The computer system of claim 17, wherein the two accounts share two or more linking strategies; and wherein generating the account linking probability for the two accounts further comprises:

selecting a subset of the two or more linking strategies with non-overlapping account attributes; and generating the account linking probability for the two accounts as a function of the subset of the two or more linking strategies.

20. The computer system of claim 19, wherein selecting the subset of the two or more linking strategies with non-overlapping account attributes comprises:

sorting the two or more linking strategies in descending order of average linking probabilities; and iteratively evaluating the two or more linking strategies in the descending order of average linking probabilities to determine whether to include the linking strategy at each iteration in the subset of the two or more linking strategies, wherein a linking strategy evaluated at an iteration is included in the subset of the two or more linking strategies if the linking strategy does not correspond with an account attribute of a linking strategy previously selected for the subset of the two or more linking strategies.

* * * * *